United States Patent [19]

Smith

[11] Patent Number: 5,142,906

[45] Date of Patent: Sep. 1, 1992

[54] APPARATUS FOR MEASURING VALVE STEM LOADS IN A MOTOR OPERATED VALVE ASSEMBLY

[75] Inventor: Christopher P. Smith, Cobb County, Ga.

[73] Assignee: Westinghouse Electric Corp., Pittsburgh, Pa.

[21] Appl. No.: 550,336

[22] Filed: Jul. 9, 1990

[51] Int. Cl.$^5$ .................... G01M 9/00; G01L 1/22; F16K 31/05

[52] U.S. Cl. .................. 73/168; 73/862.65; 73/862.627

[58] Field of Search ............... 73/168, 862.65, 862.62, 73/862.66, 862.38, 862.36, 862.08, 862.26, 862.63

[56] References Cited

U.S. PATENT DOCUMENTS

| | | | |
|---|---|---|---|
| 3,696,317 | 10/1972 | Farr | 73/862.66 |
| 3,869,906 | 3/1975 | Andersson | 73/862.66 |
| 3,985,025 | 10/1976 | Ormond | 73/862.66 |
| 4,182,168 | 1/1980 | Desch | 73/140 |
| 4,193,720 | 3/1980 | Machida | 408/11 |
| 4,194,393 | 3/1980 | Boley | 73/151 |
| 4,251,918 | 2/1981 | Duggun | 33/148 |
| 4,498,336 | 2/1985 | Dalton | 73/168 |
| 4,542,649 | 9/1985 | Charbonneau | 73/168 |
| 4,543,837 | 10/1985 | Stern | 73/862 |
| 4,546,838 | 10/1985 | Ormond | 73/862.66 |
| 4,570,903 | 2/1986 | Crass | 251/129.12 |
| 4,619,147 | 10/1986 | Yoshimura | 73/862.38 |
| 4,657,097 | 4/1987 | Griffen | 177/211 |
| 4,674,342 | 6/1987 | Ushijima | 73/862.65 |
| 4,694,390 | 9/1987 | Lee | 364/165 |
| 4,759,224 | 7/1988 | Charbonneau et al. | 73/168 X |
| 4,787,245 | 11/1988 | Anderson | 73/168 |
| 4,805,451 | 2/1989 | Leon | 73/168 |
| 4,856,327 | 8/1989 | Branam | 73/168 |
| 4,936,150 | 6/1990 | Burke | 33/788 |
| 4,977,782 | 12/1990 | Stohr et al. | 73/168 X |
| 5,020,773 | 6/1991 | Tuft et al. | 73/168 X |
| 5,027,651 | 7/1991 | Gyr | 73/168 |
| 5,090,239 | 2/1992 | Balaschak et al. | 73/168 |

OTHER PUBLICATIONS

Measurements Group, Inc. "Strain Gage Based Transducers", Chapter 2; pp. 7–28.

"Electronic Torque Monitoring for Valve Drives", Sulzer Technical Review, Apr. 1978, vol. 60; pp. 169–171.

Primary Examiner—Stuart S. Levy
Assistant Examiner—Joseph A. Rhoa

[57] ABSTRACT

An in-series load bearing sensor is provided for use with a motor operated valve assembly. The in-series load bearing sensor is installed in the mechanical load path between the actuator and valve yoke to provide a direct measurement of valve stem thrust and/or actuator output torque under actual operating conditions. Sensor is precalibrated and can be installed temporarily for testing purposes or permanently for ongoing monitoring of valve performance. Webs (40) have strain gauges (41, 42, 43) thereon which measure the valve stem torque and valve stem thrust at any given moment. Webs (40) link an inner load ring (30) and an outer load ring (20).

36 Claims, 8 Drawing Sheets

APPARATUS FOR MEASURING VALVE STEM LOADS IN A MOTOR OPERATED VALVE ASSEMBLY

FIELD OF THE INVENTION

The present invention relates generally to the field of strain gage based transducers, and particularly to the use of these devices for measuring mechanical loads, including thrust and/or torque, induced by the action of an external motive force upon an axial member such as a valve stem.

BACKGROUND OF THE INVENTION

Many examples of Motor Operated Valve (MOV) stem thrust measurement systems are found in the prior art which utilize strain gage based transducers in various configurations to measure stem thrust during test conditions. During testing in one such system, secondary indicators (such as spring pack displacement) are correlated to stem thrust measurements taken with a strain gage type load cell. Then, under actual operating conditions, the secondary indicator is used to measure operating stem thrust, based on the test measurement correlations.

A prime example of this type system is the Charbonneau et al Analysis and Testing System disclosed in U.S. Pat. No. 4,542,649, incorporated herein by this reference (Charbonneau '649), which uses a compressive load cell to measure stem thrust as the valve stem moves in the valve opening direction. Spring pack displacement is measured simultaneously with the stem thrust measurement, allowing the relationship between the two values to be measured. This correlation is used subsequently to derive stem thrust values from spring pack displacement measurements. Another prior art device associated with MOVs, Crass (U.S. Pat. No. 4,570,903), though more limited in its analysis and testing than Charbonneau, uses a tension load cell to measure stem thrust as the valve stem moves in the valve closing direction for calibration with a secondary indicator.

Industry preference has leaned toward placement of sensors as near (in the mechanical chain) as possible to the actual stem thrust and for measurement throughout the valve cycle. Leon (U.S. Pat. No. 4,805,451) has attached a strain sensing device to the exterior of the valve yoke in an attempt to measure axial stresses in the valve yoke. Branam et al (U.S. Pat. No. 4,856,327) utilizes load cells, clamped under a compressive preload between the actuator and valve yoke, in an attempt to measure tensile and compressive reaction forces which are described in that patent as being proportional to axial stem thrust.

While these systems provide a potential method of continual monitoring of stem thrust, at close proximity to the valve stem, they experience certain drawbacks. For example, without limitation, they are not installed as a full load bearing member between the actuator and valve, therefore, they must be individually calibrated for each installation to determine how readings relate to actual stem load.

Leon uses a strain sensing device attached to the exterior of the valve yoke, mounted to one of the two yoke arms. Stem thrust reaction is carried by the two yoke arms, but is not necessarily distributed equally throughout that structure. Strain measurements from the valve yoke are used to infer stem thrust; compression in the yoke is a reaction to tension in the valve stem, and vice versa. However, the Leon sensing device must be attached to a valve yoke and calibrated for that particular yoke, by applying a known load to the yoke or to the valve stem, and correlating the sensing device output to the known load. Later, the measured valve yoke strain is used to infer valve load. This method suffers from data uncertainty resulting from variables in the calibration method. Calibration of sensor output to stem thrust must be performed under field conditions which are often harsh. Also, the relationship between stem thrust and yoke strain can change due to changes in mechanical conditions, making frequent recalibration necessary. This device is attached to the exterior of the yoke in a somewhat fragile manner (by soldering, brazing, welding, epoxying or gluing).

Branam utilizes load sensors, in parallel loading with actuator mounting bolts, between the actuator and valve yoke. The Branam sensors carry only part of the load between the actuator and valve yoke, with the bolts carrying the remainder. Due to this mounting scheme the load sensors must be calibrated after the bolts are tightened to a desired, but variable level. This variable preloading of the load sensors results in a correction factor which must be computed for each valve operator assembly, and varies depending on the bolt material used, the size of the bolts, and the free length of the bolted connection. Also, the preload applied to the fasteners is liable to change due to small mechanical shifts in the thread contact areas during testing.

The prior art sensing devices previously discussed are designed primarily for operation on MOVs of the rising stem type, where the valve stem travels axially to raise or lower the valve plug or gate within the valve, opening or closing the valve respectively. Rising stem valves can be separated into two categories. The "rising non-rotating stem" design has a valve stem which is restrained from rotation and rises due to rotation of a threaded valve stem nut around a threaded section of the valve stem. In a "rising rotating" valve stem configuration, a threaded valve yoke nut is rigidly mounted in the center of the valve yoke flange, and the valve stem rotates due to the interaction of a splined stem nut, which is rigidly attached to one end of the valve stem, with a splined drive sleeve. As the threaded valve stem rotates against the threads on the yoke nut, it is forced to move axially, and the stem nut slides axially within the drive sleeve. The discussed, prior art devices appear to be of little value in measuring stem associated with MOV types in which the valve plug does not rise, but rotates ninety degrees to move between an open or closed position. This "quarterturn" or "rotating" valve experiences negligible thrust when operated and a torque-only sensor is needed to monitor and evaluate valve operating performance.

SUMMARY OF THE INVENTION

Briefly described, the present invention comprises a method and apparatus for measuring MOV stem loads, including thrust and/or torque, but should not be limited to this specific application. Although the present invention finds its best use in motor operated valves, alternate embodiments are envisioned which are actuated by other motive forces, such as manually or pneumatically operated valves. It is also contemplated that the method and apparatus of the present invention can be applied to other embodiments where an external motive force is applied to an axial member, not necessarily a valve stem, and where it is desirable to obtain accurate measurement of resistance which opposes movement of the axial member.

The method of the present invention uses known principles and specifications related to stress and strain of metals and applies these principles and specifications in combination with the unique apparatus of the preferred embodiments of the present invention to detect and measure mechanical thrust and/or torque operating on the valve stem of a MOV. This in-series load bearing sensor is, in the preferred embodiment, calibrated to provide output which directly indicates the values of thrust and torque acting upon it. As it is a direct, series part of the load path, there are no correlations or in-place calibrations necessary - the cell output is a primary measurement of valve stem thrust and actuator output torque. Upon installation in the field, this will provide all data necessary for accurate load measurements, without additional calibration.

Installing such an apparatus between the actuator and yoke of a MOV, in series with the loads, will enable full value measurement of both torque and tensile or compressive axial force. While accurate readings of MOV stem thrust and actuator output torque are difficult to obtain, it is particularly difficult to measure the interrelationship between these parameters. Actuator output torque measurements under torque only circumstances are not necessarily valid due to the effect of drive sleeve thrust on efficiency. To obtain accurate measurements of these parameters it is necessary to measure torque and thrust simultaneously, and to date no MOV analysis system is capable of this. In accordance with the present invention, torque and thrust measurements are obtained simultaneously, and thus, stem factor, or the ratio of actuator output torque to stem thrust, is calculated, providing an ideal indicator of valve operating efficiency.

In the preferred embodiment of this disclosure, the apparatus of the present invention comprises an in-series load bearing sensor which is installed between the yoke and actuator mating surfaces in a MOV and which permits stem clearance through its center. Construction of such an apparatus, with a reasonably low profile, which in one preferred embodiment is split to allow installation without removing the actuator from the valve stem, provides an ideal field diagnostic transducer. Advantages of such a sensor include its low profile, insensitivity to extraneous loads, linearity, durability, ease of protection, and the wide range of possible gauging techniques.

Load is preferably measured dynamically: with the actuator providing motive force and the valve providing load; and where forces and moments at the yoke / actuator interface are reactions that are equal and opposite to the actual forces acting upon the valve stem. In the past these forces were typically be calculated inferentially.

It is, therefore, an object of the present invention to provide a method for determining stem thrust, actuator output torque and stem factor simultaneously throughout the entire stroke of an MOV with a high degree of accuracy.

Another object of the present invention is to provide a torque and thrust measurement device which is pre-calibrated in both parameters, with operating accuracy exceeding that of presently available stem thrust measurement systems.

Yet another object of the present invention is to measure full, isolated values of both torque and thrust by introducing a measurement device as a series component of the load path, as opposed to systems which sense force in parallel with mechanical parts and introduce large errors and unknown scaling factors.

A further object of the present invention is to provide a measuring device which can be used for conventional diagnostics or for special studies such as in-situ lubrication behavior testing, differential pressure testing, or reduced voltage performance studies.

Another object of the present invention is to provide a torque and/or thrust measurement device which can be installed permanently in a MOV and connected to an on-line monitoring system.

Another object of the present invention is to provide a MOV stem load measurement device which digitizes information at the sensor body to eliminate transmission errors, for use, for example, in Plants that have fiber optics trunks.

Other objects, features, and advantages of the present invention will become apparent upon reading and understanding this specification, taken in conjunction with the accompanying drawings.

DETAILED DESCRIPTION OF THE PREFERRED EMBODIMENTS

Figure 1:
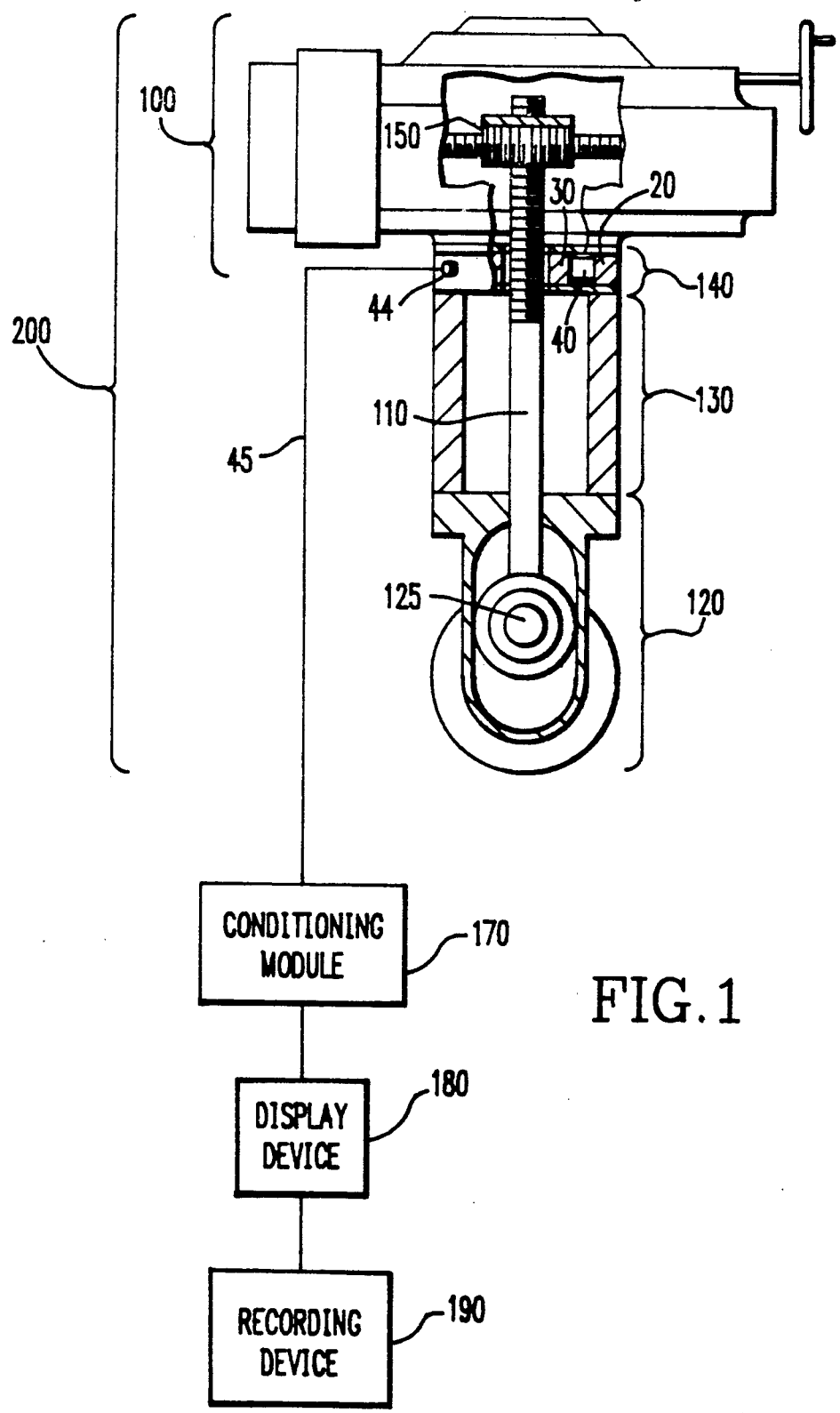
FIG. 1 is a side view, with portions broken-away for clarity, of a rising non-rotating motor operated valve system outfitted with an in-series load bearing sensor in accordance with the present invention.

Referring now in greater detail to the drawings, in which like numerals represent like components throughout the several views, FIG. 1 depicts a rising non-rotating MOV system 200, outfitted in accordance with the preferred embodiment of the present invention as including: an actuator 100 which provides motive force to a valve stem nut 150, which rotates around a valve stem 110, which in turn serves to move a valve plug 125 between closed and open positions; and a valve yoke 130 partially enclosing the valve stem 110. One preferred embodiment of the in-series load bearing sensor 140 of the present invention is shown installed here in its operating position, as part of the MOV system 200, connected to the actuator 100 on one side, and to the valve yoke 130 on another side. A conditioning module 170, sensor output display device 180, and recording device 190 are cabled to the in-series load bearing sensor 140.

A cut-away portion of the in-series load bearing sensor 140 of FIG. 1 reveals an outer load ring 20 and an inner load ring 30 connected by a shear-web 40. In this embodiment the inner load ring 30 is shown attached to the actuator 100, with the outer load ring 20 attached to the valve yoke 130. It is acceptable to reverse this arrangement, with the outer load ring 20 attached to the actuator 100 and the inner load ring 30 attached to the valve yoke 130, without affecting the operation of the in-series load bearing sensor 140.

Figure 2:
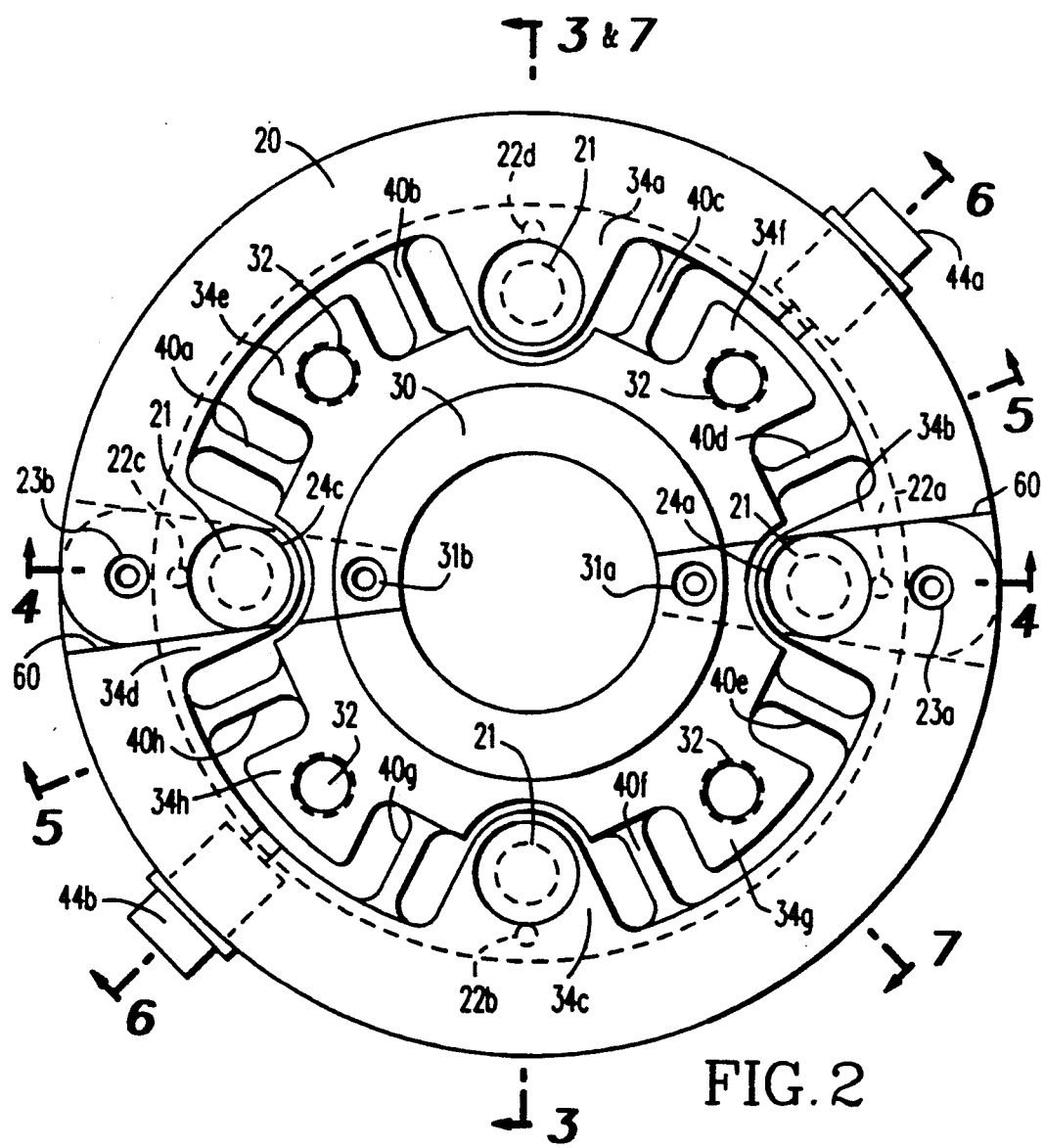
FIG. 2 is a bottom view of an in-series load bearing sensor, in accordance with the present invention, showing a preferred embodiment for use with a rising non-rotating MOV.
Figure 7:
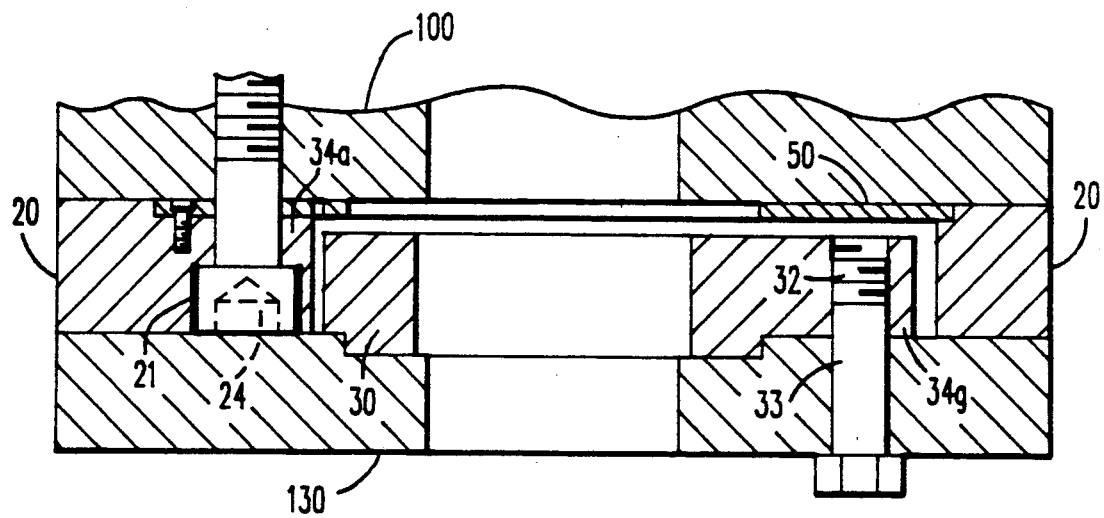
FIG. 7 is a cross sectional view of the in-series load bearing sensor of FIG. 2 taken along view 7—7.

The herein disclosed, preferred embodiment for an in-series load bearing sensor 140 is shown in FIG. 2 as including an outer load ring 20 and an inner load ring 30 connected by eight shear-webs 40a–40h. This in-series load bearing sensor 140 is configured for attachment between an actuator 100 and valve yoke 130 which are normally joined, for this particular configuration, by four bolts. Other acceptable embodiments utilizing more or less than four bolts are contemplated within the scope of the present invention and following with the principles of the herein disclosed embodiments. To keep the profile of the in-series load bearing sensor 140 to a minimum, the bolt holes 32 of the inner load ring 30 are seen to be angularly displaced (or "rotated") 45 degrees from the bolt holes 21 of the outer load ring 20. The purpose for this is illustrated in the cross sectional view of FIG. 7, where it can be seen that the sensor profile would have to be increased if the inner load ring bolt 33, which connects through inner load ring bolt hole 32 to the valve yoke 130, was aligned with the outer load ring bolt 24 which connects through outer load ring bolt hole 21 to the actuator 100. For other configurations, the angle of rotation X can be determined from the formula X (360/2N), where N is the number of attachment bolts.

The preferred in-series load bearing sensor 140 is also seen as including boss brackets 34a–34h protruding from the load rings to provide a stronger bolt mounting surface. Boss brackets 34a–34d are associated with outer load ring bolt holes 21, and boss brackets 34e–34h are associated with inner load ring bolt holes 32. A pilot plate 50 (see FIGS. 3–6) serves a dual purpose in this preferred embodiment: to properly align the actuator 100 with the in-series load bearing sensor 140, and to cover the mechanism. The pilot plate 50 is attached to the outer load ring by pilot plate screws 22a–22d.

Figure 4:
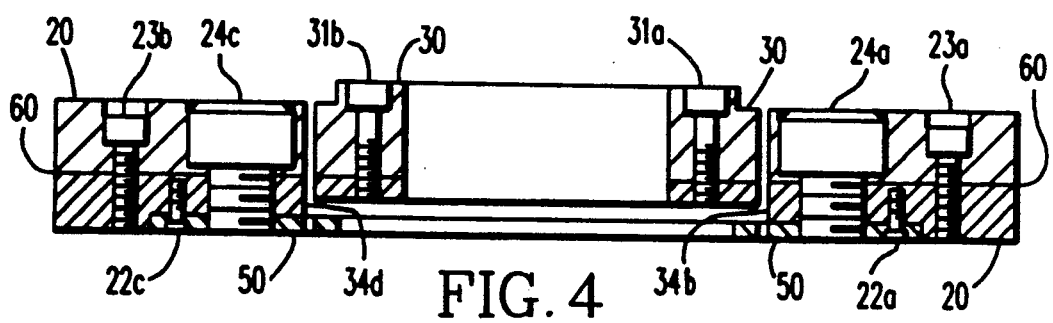
FIG. 4 is a cross sectional view of the in-series load bearing sensor of FIG. 2 taken along view 4—4.
Figure 5:
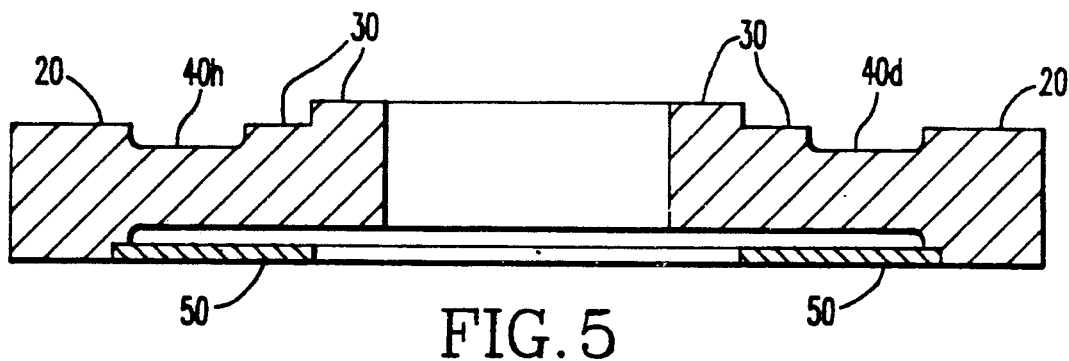
FIG. 5 is a cross sectional view of the in-series load bearing sensor of FIG. 2 taken along view 5—5.
Figure 6:
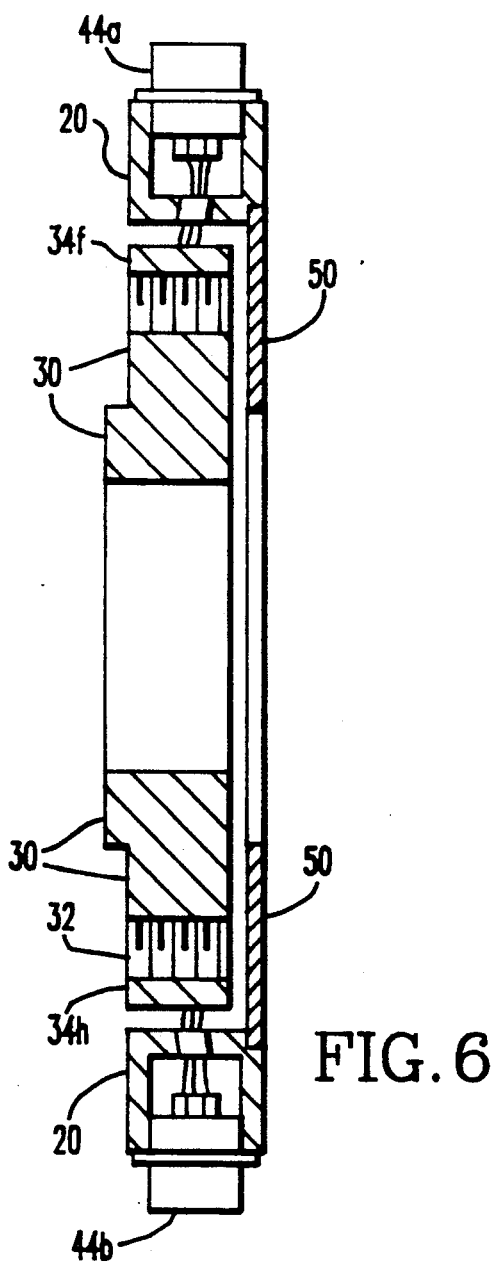
FIG. 6 is a cross sectional view of the in-series load bearing sensor of FIG. 2 taken along view 6—6.
Figure 3:
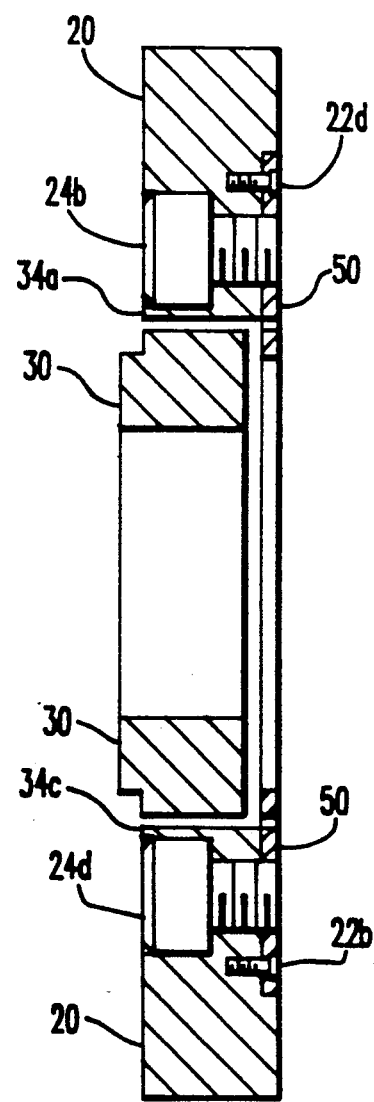
FIG. 3 is a cross sectional view of the in-series load bearing sensor of FIG. 2 taken along view 3—3.

Another feature of the herein disclosed preferred embodiment is that the in-series load bearing sensor 140 is split by a lap joint 60 to allow for installation without removing the valve stem 11 from the MOV assembly. This lap joint 60, illustrated in FIGS. 2 and 4, is located in a relatively unloaded area of the sensor and will not significantly reduce the rigidity of the sensor or otherwise negatively impact the operation of the sensor when properly installed. The overlapping areas of the lap joint are clamped together in the outer load ring area by two of the outer load ring bolts 24a, 24c. Inner lap joint screws 31a, 31b and outer lap joint screws 23a, 23b further bind the two halves of the in-series load bearing sensor together in the preferred embodiment. Prior to installation, one of the outer lap joint screws 23a should be attached, to act as a hinge and aid in alignment of the in-series load bearing sensor 140 with the actuator 100 and valve yoke 130. The pilot plate 50 for the preferred embodiment is split also, so it can be attached to the sensor before installation.

Figure 8:
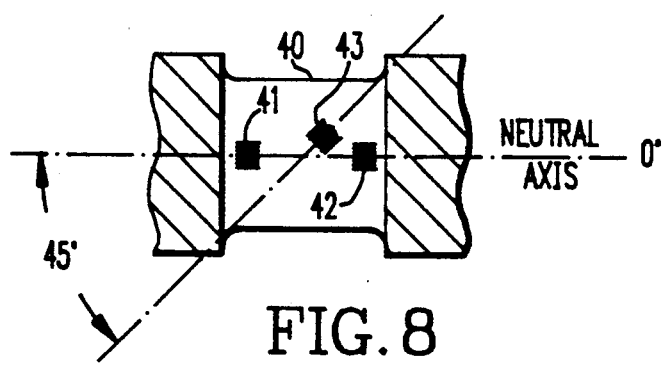
FIG. 8 is a side view of a shear-web of the in-series load bearing sensor of FIG. 2, showing placement of strain gauges in a preferred embodiment.

In the preferred embodiment of FIG. 2, eight shear-webs 40a–40h are used as the sole load bearing member between the inner load ring 30 and the outer load ring 20, and thus carry all reaction forces, resulting from valve stem 110 movement, between the valve yoke 130 and actuator 100. FIG. 8 shows a side view of one shear-web 40 of the in-series load bearing sensor 140, and the preferred placement of strain gages thereon. Gages 41 and 42 are placed on the neutral axis to measure torque, and gage 43 is placed for measuring axial thrust, at an angle of forty five degrees from the neutral axis. In the herein disclosed preferred embodiment, with eight shear-webs 40, there would be a total of 32 torque measurement gages and 16 thrust measurement gages. One example of an acceptable strain gage for use as strain gages 41, 42 and 43 is a gage known as a general purpose constantan alloy strain gage, (such as the EA-Series sold by Measurements Group, Inc., of Raleigh, N.C.) which is glued to the respective shear web 40a–40h in a manner known in the industry.

In the preferred embodiment, the torque strain gages 41 and 42 on shear webs 40a–40d are wired together to form a Wheatstone Bridge circuit connected to wiring connector 44a. Likewise, torque strain gages 41 and 42 on shear webs 40e–40h are wired in series to form a Wheatstone Bridge circuit, connected to wiring connector 44b. Likewise, thrust strain gages 43 are wired together on shear webs 40a–40d to form a Wheatstone Bridge circuit connected to wiring connector 44a, and thrust strain gages 43 on shear webs 40e–40h are wired together to form a Wheatstone Bridge circuit connected to wiring connector 44b. These four Wheatstone Bridge circuits, two for torque and two for thrust are connected by cable 45 to conditioning device 170, where the two torque circuits are combined to form one multi-element Wheatstone Bridge circuit and the two thrust circuits are combined to form one multi-element Wheatstone Bridge circuit. The operation of Wheatstone Bridges and the use of such to interrelate the output of strain gages is deemed understood in the art and, therefore, more detailed explanation of these Wheatstone Bridge arrangements is deemed unnecessary in this disclosure.

Operation. The following is an example of at least one mode of using the embodiment of FIGS. 2-8 of the in-series load bearing sensor 140 of the present invention. The embodiment of FIGS. 2-8 of this disclosure is intended for use in a rising, nonrotating MOV. In the field, bolts connecting the actuator 100, (see FIG. 1) to the valve yoke 130 are removed and the actuator moved away from the valve yoke to provide clearance for insertion of the load bearing sensor. Use of a "split" design of the preferred embodiment allows installation without completely removing the actuator 100 from the valve stem 110.

When using a "split" embodiment, prior to installation, the two halves of the in-series load bearing sensor 140 are attached first in one overlapping lap joint area of the outer load ring 20 with outer lap joint screw 23a (FIG. 2). By attaching only one side, the two halves of the sensor 140 are hinged together for proper orientation to each other, and can be more easily aligned with the actuator 100 and valve yoke 130. Also prior to installation, the pilot plate 50, which is also split in half in the "split" embodiment, will be attached to the outer load ring 20 with pilot plate screws 22.

With the in-series load bearing sensor 140 inserted between the actuator 100 and valve yoke 130 the remaining lap joint screw 23b is attached. The in-series load bearing sensor 140 is next attached to the actuator with outer load ring bolts 21, two of which, 21a, 21c serve to further strengthen the lap joint 60 attachment. The inner lap joint screws 31 are installed prior to attaching the in-series load bearing sensor 140 to the valve yoke 130.

The installation is completed by attaching the valve yoke 130 to the in-series load bearing sensor 140. In the herein disclosed preferred embodiment, the actuator 100 must be rotated forty five degrees from its original position relative to the valve yoke 130 before this can be done, as the inner load ring bolt holes 32, which are used for valve yoke 130 attachment, are located between the outer load ring bolt holes 21.

The in-series load bearing sensor is precalibrated by the manufacturer, who runs quality assurance tests by applying known loads to the sensor. That is, upon installation, the sensor output will provide all information needed to obtain meaningful thrust/torque measurements, without the necessity of post installation testing with known loads, etc. Deformation in the shear webs results in a change to the relative resistance of the strain gages mounted thereon. All of the torque sensing strain gages are connected to form a multi-element Wheatstone Bridge torque circuit and the thrust sensing strain gages are connected to form a multi-element Wheatstone Bridge thrust circuit. The change in voltage from the torque circuit (MVo) and the change in voltage from the thrust circuit (FVo) is converted at the conditioning module 170 from an analog signal to a digital form for output to an external display device 180, where this output will be used as an indicator of actual torque and thrust. Finally, in the preferred embodiment, output from the conditioning module 170 will go to a recording device 190, for example stored on a computer disk, for subsequent analysis.

Figure 9:
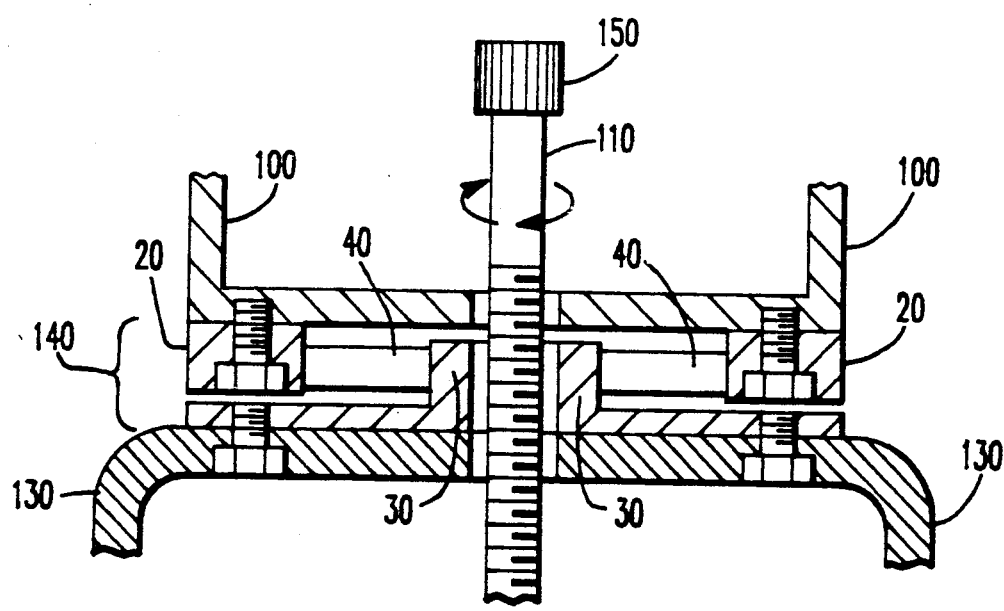
FIG. 9 is an isolated side view, with portions broken-away for clarity, of a rotating motor operated valve system outfitted with an in-series load bearing sensor for measuring stem torque, in accordance with a first alternate embodiment of the present invention.

Alternate preferred embodiments, are illustrated in FIGS. 9-13. FIG. 9 shows an embodiment which is instrumented to measure torque only and is designed for use with a rotating valve, such as a quarter-turn valve. Here, the actuator 100 is attached to the outer load ring 20 of an in-series load sensor 140. The outer load ring 20 is attached by shear webs 40 to an inner load ring 30, and the inner load ring is rigidly attached to the valve yoke 130. The in-series load sensor 140 is the only connection between the actuator 100 and valve yoke 130, and carries a torque reaction to any rotational resistance experienced by the valve stem 110. Strain gages mounted to the shear webs 40 are instrumented to provide full output torque measurements.

Alternate embodiments discussed hereafter are designed for use with MOVs having rising rotating valve stems, whereas the previously described preferred embodiment is preferably used with a MOV having a rising non-rotating valve stem. Rising rotating valve stem MOVs are constructed such that the valve stem 110 rotates due to the rotation of a splined drive sleeve which contains and rotates a splined stem nut 150, which is rigidly attached to the valve stem 110. As the valve stem 110 rotates, a threaded yoke nut 160, fixed in the center of the valve yoke 130 flange, causes the valve stem 110 to move axially due to the orientation and cooperation of the yoke nut 160 threads with threads on the valve stem 110.

Figure 10:
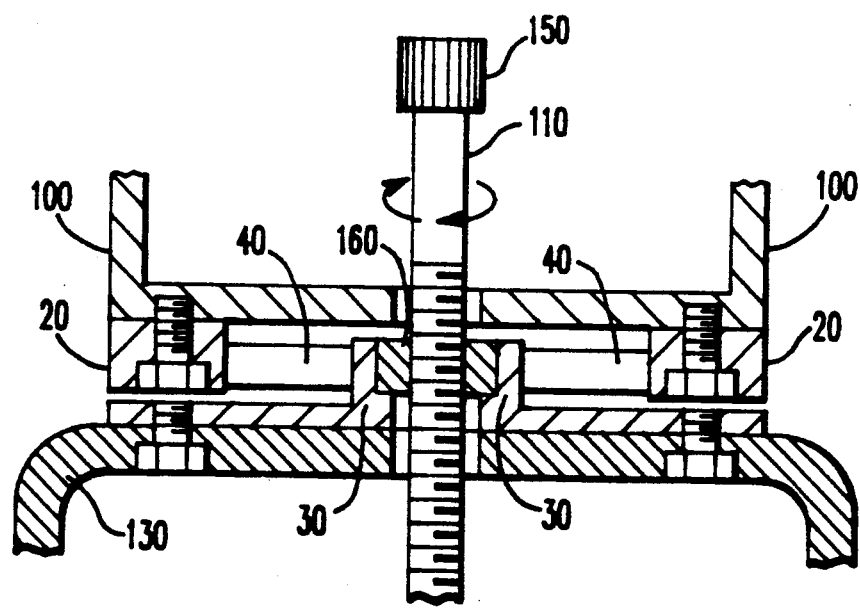
FIG. 10 is an isolated side view, with portions broken-away for clarity, of a rising rotating motor operated valve system outfitted with an in-series load bearing sensor for measuring stem torque, in accordance with a second alternate embodiment of the present invention.

FIG. 10 shows an embodiment of the in-series load bearing sensor 140, designed for use on a MOV having such a rising rotating valve stem, and configured to measure torque, in a manner similar to the embodiment of FIG. 9. Here however, the valve stem 110 is actuated by the rotation of the valve stem within the yoke nut 160, which is rigidly mounted within the inner load ring 30. In this embodiment, the valve stem 110 is threaded to match the yoke nut 160 threads and moves axially up or down depending on the direction of rotation of the valve stem. As the shear webs 40 provide the only mechanical connection between the actuator 100 and the yoke nut 160, stem 110 and valve plug 125, the shear webs carry a torque reaction component and can be instrumented to measure full actuator output torque.

Figure 11:
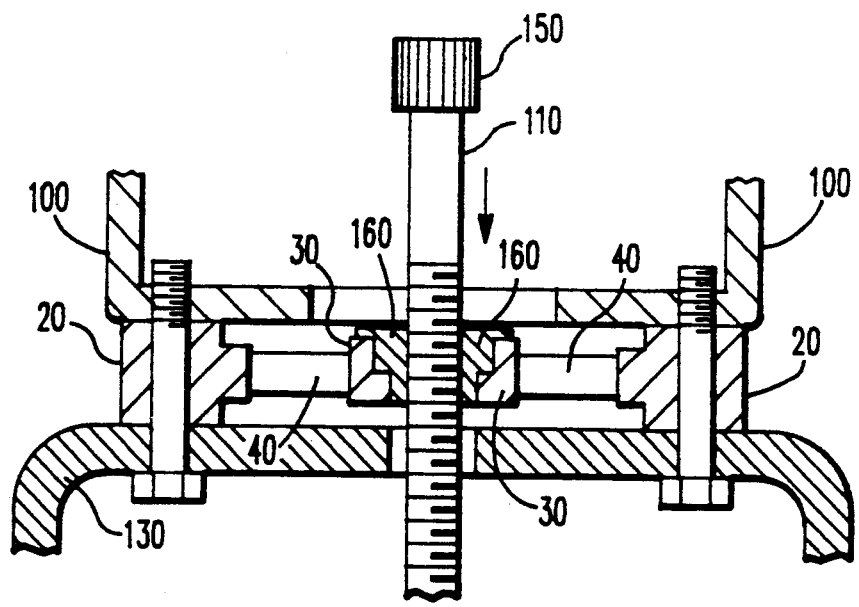
FIG. 11 is an isolated side view, with portions broken-away for clarity, of a rising rotating motor operated valve system outfitted with an in-series load bearing sensor for measuring stem thrust, in accordance with a third alternate embodiment of the present invention.

FIG. 11 illustrates an embodiment of the in-series load bearing sensor 140, designed for use on a MOV having a rising rotating valve stem, which is simple in operation and configured for measuring thrust only. An outer load ring 20, for attachment between the valve yoke 130 and the actuator 100, is connected to an inner load ring 30 by a plurality of shear webs 40. A yoke nut 160 is mounted in the center of the inner load ring 30. When thrust resistance is encountered by the valve stem 110, strain gages mounted on the shear webs 40 will detect a deflection that is equal and opposite to the valve stem thrust. In this embodiment it is not necessary to isolate the actuator 100 from the valve yoke 130 as the outer load ring 20 simply serves as a spacer, and long studs, passing through the outer load ring, can be used to attach the actuator to the valve yoke.

Figure 12A:
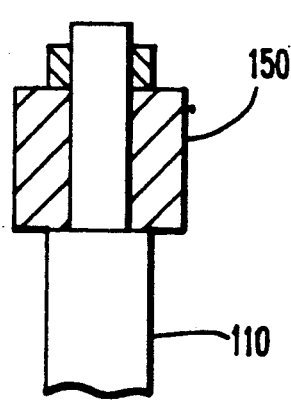
FIG. 12A is a cross sectional view of a stem nut and valve stem attachment.
Figure 12B:
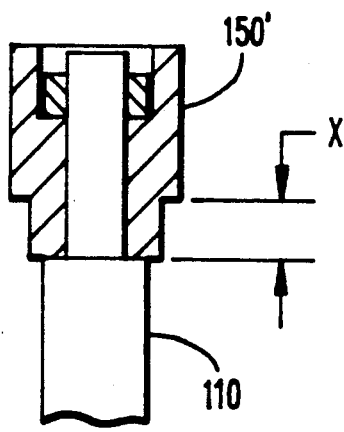
FIG. 12B is a cross sectional view of an extended stem nut and valve stem attachment.

FIGS. 12A and 12B present a solution to a problem caused by the introduction of an in-series load bearing sensor 140 between the actuator 100 and valve yoke 130 of a MOV having a rising rotating valve stem 110. Stem length affects the height of the stem nut 150 in the drive sleeve. Introduction of an in-series load bearing sensor 140 between the valve yoke 130 and actuator 100 effectively reduces stem length, and this can be compensated for by replacing the original stem nut 150, as shown in FIG. 12A, with an extended stem nut 150', as shown in FIG. 12B, which has been extended by X, the profile height of the in-series load bearing sensor 140.

Figure 13:
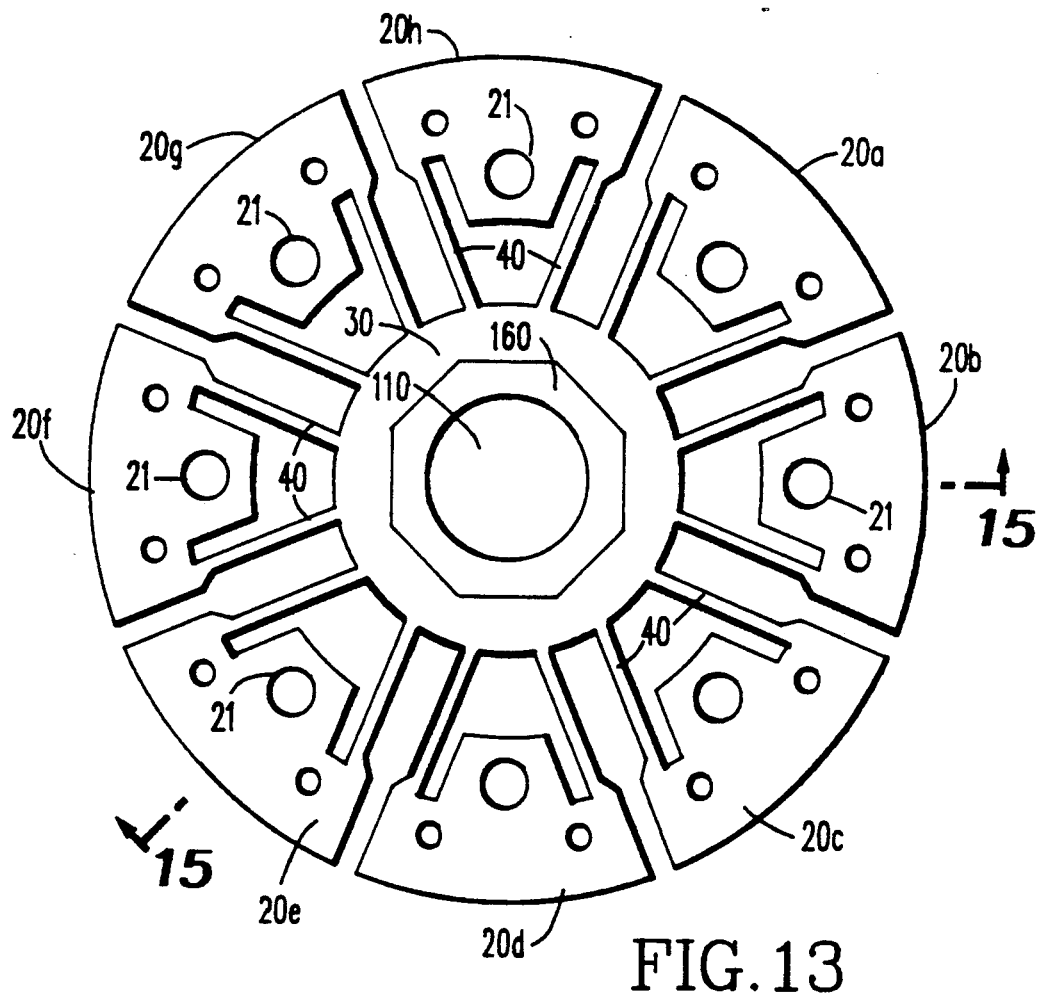
FIG. 13 is a top view of an in-series load bearing sensor, in accordance with the present invention, showing an alternate preferred embodiment for measuring thrust and torque in a rising rotating MOV.
Figure 15:
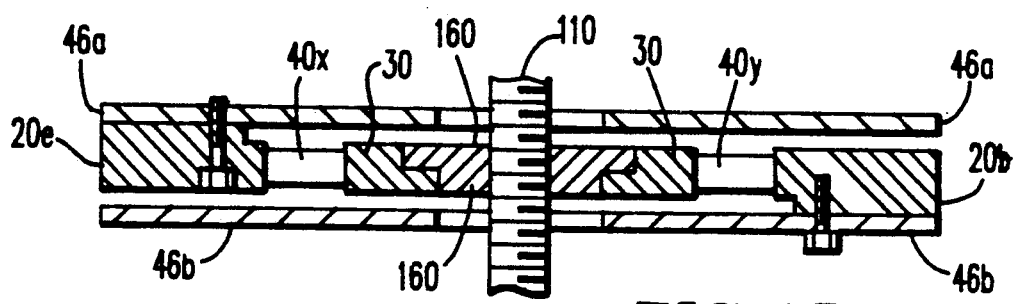
FIG. 15 is a cross sectional view of the in-series load bearing sensor of FIG. 13 taken along view 15—15.
Figure 14:
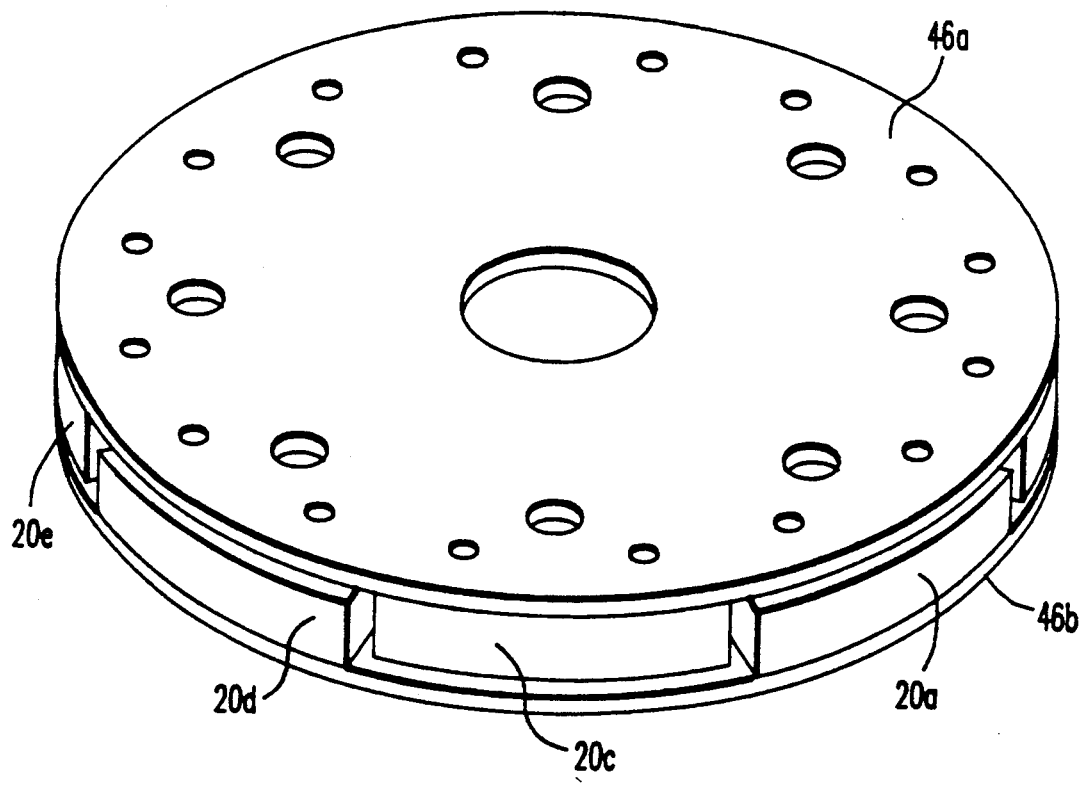
FIG. 14 is a perspective view of the in-series load bearing sensor of FIG. 13.

FIGS. 13-15 show an embodiment which combines the concepts illustrated in FIGS. 10 and 11 to provide torque and thrust measurements in a rising rotating MOV. In this embodiment the outer load ring 20 is cut into eight segments, with alternating segments being attached to the valve yoke 130 (20b, 20d, 20f, 20h) and actuator 100 (20a, 20c, 20e, 20g). Each set of segments (yoke set and actuator set) in this embodiment are joined into a rigid structure by attachment to a plate, 46a on the actuator attachment side and 46b on the valve yoke attachment side (see FIG. 14). Each outer load ring segment is attached to two shear webs 40, which in turn are attached to a non-segmented inner load ring 30. A yoke nut 160 is rigidly mounted in the center of the inner load ring 30, with the valve stem 110 threaded through the center of the yoke nut. For a sixteen web structure, as shown in FIG. 13, the outer ring segments each carry two webs, with eight torque only webs attached to the actuator 100, and eight thrust only webs attached to the valve yoke 130, in a reasonably rigid structure. The cross sectional view of FIG. 15 illustrates the similarity between shear web 40x, which is instrumented for torque, and the shear webs 40 of the torque only in-series load bearing sensor 140 of FIG. 10. This view also shows the similarity between shear web 40y and the shear webs 40 of the thrust only embodiment of FIG. 11.

Whereas the present invention has been described in detail with specific reference to particular embodiments thereof, it will be understood that variations and modifications can be effected within the spirit and scope of the present invention as hereinbefore described and as defined in the appended claims.

I claim:
1. In a motor operated valve which includes an actuator, a valve yoke, a valve plug, and a valve stem for transferring motive force from the actuator to the valve plug to move the valve plug between an open and a closed position, a pre-calibrated apparatus is provided for measuring actual valve stem operating load comprising:
   a first plate, said first plate including at least a top and bottom surface, said first plate top surface attached to the actuator;
   a first plate aperture, centrally located on said first plate top surface and communicating with said first plate bottom surface;
   a second plate, said second plate including at least a top and bottom surface and positioned parallel to and below the plane of said first plate, said second plate bottom surface attached to the valve yoke;
   a second plate aperture, centrally located on said second plate top surface and communicating with said second plate bottom surface;
   an inner load ring attached to said first plate bottom surface, centered around said first plate aperture;
   an outer load ring attached to said second plate top surface, said outer load ring having a radius greater than said inner load ring radius;
   a plurality of web members radially linking said inner load ring and said outer load ring; and
   thrust sensor means attached to at least one of said web members for measuring shear stresses within said web member.
2. Apparatus of claim 1, further comprising:
   torque sensor means attached to at least one of said web members for measuring bending stresses in said web member.
3. In combination:
   a valve actuator comprising, at least, means for generating a motive force;
   a valve including, at least, a valve conduit segment and a valve plug movable between an open position and a closed position within said valve conduit segment;
   a valve stem for transferring motive force from said actuator to said valve plug to move said valve plug between said open position and said closed position;
   a yoke supporting said actuator above said valve;
   a load sensing assembly positioned between said yoke and said actuator, said load sensing assembly comprising, at least,
      a first web support member centered around said valve stem, said first web support member including, at least, a body section and an inside perimeter defining a passage, said passage accommodating travel of said valve stem therethrough,
      a second web support member,
      a plurality of web members supported between said first web support member and said second web support member, each said web member of said plurality of web members extending radially along a ray centered at the axis of the valve stem,
      said web members being the sole load bearing members between said first web support member and said second web support member, and
      first measurement means attached to at least one of said web members for measuring forces within said web member,
   whereby reaction forces resulting from said motive forces are experienced at the web members and measured by the measurement means.
4. Combination of claim 3, wherein said first web support member is mounted to said actuator and said second web support member is mounted to said yoke, and wherein the distance between any two points along said inside perimeter of said first web support member, measured through the center line of said valve stem, is greater than the outside diameter of said valve stem; whereby said web members are the sole load bearing members between said actuator and said yoke.
5. Apparatus of claim 4, wherein said load sensing assembly further comprises, at least:
   a plurality of first mounting brackets associated with said first web support member by which said first web support member is mounted to said actuator, each said bracket of said plurality of first mounting brackets defining a mounting hole formed therein, and
   a plurality of second mounting brackets associated with said second web support member by which said second web support member is mounted to said yoke, each said bracket of said plurality of second support brackets defining a mounting hole formed therein; and
   wherein the center lines of said mounting holes of all said first mounting brackets are all aligned along a common circle, and the center lines of said mounting holes of all said second mounting brackets are all aligned along said common circle; and
   wherein each said mounting hole of said plurality of first mounting brackets is angularly displaced from each said mounting hole of said plurality of second mounting brackets.
6. Apparatus of claim 4, wherein said first measurement means comprises, at least, thrust sensor means for measuring shear stresses within said web member, and wherein said load sensing assembly further comprises, at least, torque sensor means attached to at least one of said web members for measuring bending stresses in said web member.

7. Combination of claim 3, wherein said second web support member is mounted to said actuator and said first web support member is mounted to said yoke; and wherein the distance between any two points along said inside perimeter of said first web support member, measured through the center line of said valve stem, is greater than the outside diameter of said valve stem; whereby said web members are the sole load bearing members between said actuator and said yoke.

8. Apparatus of claim 7, wherein said load sensing assembly further comprises, at least:
   a plurality of first mounting brackets associated with said first web support member by which said first web support member is mounted to said yoke, each said bracket of said plurality of first mounting brackets defining a mounting hole formed therein, and
   a plurality of second mounting brackets associated with said second support member by which said second web support member is mounted to said actuator, each said bracket of said plurality of second support brackets defining a mounting hole formed therein; and
   wherein the center lines of said mounting holes of all said first mounting brackets are all aligned along a common circle, and the center lines of said mounting holes of all said second mounting brackets are all aligned along said common circle; and
   wherein each said mounting hole of said plurality of first mounting brackets is angularly displaced from each said mounting hole of said plurality of second mounting brackets.

9. Apparatus of claim 7, wherein said first measurement means comprises, at least, thrust sensor means for measuring shear stresses within said web member, and wherein said load sensing assembly further comprises, at least, torque sensor means attached to at least one of said web members for measuring bending stresses in said web member.

10. Combination of claim 3, wherein said load sensing assembly further comprises, at least, threads located at said inside perimeter of said first web support member, whereby said passage defines a threaded passage; and wherein said valve stem is in threaded, connecting relationship with said first web support member; and wherein said first web support member is mounted to said yoke and said second web support member is mounted to said actuator, whereby said web members are the sole bearers of torque loads between said actuator and said yoke.

11. Apparatus of claim 10, wherein said load sensing assembly further comprises, at least:
   a plurality of first mounting brackets associated with said first web support member by which said first web support member is mounted to said yoke, each said bracket of said plurality of first mounting brackets defining a mounting hole formed therein, and
   a plurality of second mounting brackets associated with said second support member by which said second web support member is mounted to said actuator, each said bracket of said plurality of second support brackets defining a mounting hole formed therein; and
   wherein the center lines of said mounting holes of all said first mounting brackets are all aligned along a common circle, and the center lines of said mounting holes of all said second mounting brackets are all aligned along said common circle; and
   wherein each said mounting hole of said plurality of first mounting brackets is angularly displaced from each said mounting hole of said plurality of second mounting brackets.

12. Apparatus of claim 10, wherein said first measurement means comprises, at least, torque sensor means for measuring bending stresses in said web member.

13. Combination of claim 3, wherein said load sensing assembly further comprises, at least, threads located at said inside perimeter of said first web support member, whereby said passage defines a threaded passage; and wherein, said valve stem is in threaded, connecting relationship with said first web support member; and wherein said second web support member is mounted to said yoke and said first web support member is mounted to said actuator, whereby said web members are the sole bearers of torque loads between said actuator and said yoke.

14. Apparatus of claim 13, wherein said load sensing assembly further comprises, at least:
   a plurality of first mounting brackets associated with said first web support member by which said first web support member is mounted to said actuator, each said bracket of said plurality of first mounting brackets defining a mounting hole formed therein, and
   a plurality of second mounting brackets associated with said second support member by which said second web support member is mounted to said yoke, each said bracket of said plurality of second support brackets defining a mounting hole formed therein; and
   wherein the center lines of said mounting holes of all said first mounting brackets are all aligned along a common circle, and the center lines of said mounting holes of all said second mounting brackets are all aligned along said common circle; and
   wherein each said mounting hole of said plurality of first mounting brackets is angularly displaced from each said mounting hole of said plurality of second mounting brackets.

15. Apparatus of claim 13, wherein said first measurement means comprises, at least, torque sensor means for measuring bending stresses in said web member.

16. Combination of claim 3, wherein said load sensing assembly further comprises, at least, threads located at said inside perimeter of said first web support member, whereby said passage defines a threaded passage; and wherein, said valve stem is in threaded, connecting relationship with said first web support member; and wherein said second web support member is mounted to both said yoke and said actuator, whereby said web members are the sole bearers of thrust loads between said valve stem and each of said yoke and actuator.

17. Apparatus of claim 16, wherein said first measurement means comprises, at least, thrust sensor means for measuring shear stresses within said web member.

18. Apparatus of claim 16, wherein said second web support member is comprised of a plurality of separate, support segments, each said segment of said second support member being radially linked to said first web support member by at least one web member of said plurality of web members, adjacent ones of said support segments of said second web support member being mounted to a different one of said actuator and said yoke.

19. Apparatus of claim 18, wherein said first measurement means comprises, at least, thrust sensor means for measuring shear stresses within said web member, and wherein said load sensing assembly further comprises, at least, torque sensor means attached to at least one of said web members for measuring bending stresses in said web member.

20. Apparatus of claim 3, wherein said first web support member is comprised of two halves, each of said halves comprising, at least, a lap-joint segment, said lap-joint segment of one of said halves overlapping said lap-joint segment of the other of said halves to form a separable lap-joint within first web support member; and
wherein said second web support member is comprised of two halves, each of said halves comprising, at least, a lap-joint segment, said lap-joint segment of one of said halves overlapping said lap-joint segment of the other of said halves to form a separable lap-joint within said second web support member.

21. Apparatus of claim 20, further comprising, at least, first fastening means for releasably fastening together said two halves of said first web support member, and second fastening means for releasably fastening together said two halves of said second web support member.

22. In combination:
a motor operated valve which includes an actuator, a valve yoke, a valve housing a valve plug, and a valve stem for transferring motive force from said actuator to said valve plug to move said valve plug between an open and a closed position;
a pre-calibrated apparatus positioned between said actuator and said valve for measuring actual valve stem operating load, said pre-calibrated apparatus comprising:
an inner load ring, said inner load ring including, at least, a body section, an inside perimeter defining a passage, and an outside perimeter, said passage accommodating travel of the valve stem therethrough;
an outer load ring, said outer load ring including, at least, a body section, an inside perimeter, and an outside perimeter;
a plurality of web members radially linking said outside perimeter of said inner load ring and said inside perimeter of said outer load ring, said web members being the sole load bearing members between said inner load ring and said outer load ring; and
first measurement means attached to at least one of said web members for measuring forces within said web member.

23. Apparatus of claim 22, wherein said inner load ring further defines a plurality of mounting holes formed in said body section of said inner load ring, and wherein said outer load ring further defines a plurality of mounting holes formed in said body section of said outer load ring.

24. Apparatus of claim 22, wherein said first measurement means comprises, at least, thrust sensor means for measuring shear stresses within said web member, and wherein said apparatus further comprises, at least, torque sensor means attached to at least one said web members for measuring bending stresses in said web member.

25. Apparatus of claim 22, wherein said passage of said passage is centrally located within said body of said inner ring.

26. Apparatus of claim 25, wherein said inner load ring further comprises, at least, threads formed on said inside perimeter, whereby said passage defines a threaded passage.

27. Apparatus of claim 22, wherein said outer load ring is comprised of a plurality of separate, ring segments, each said segment of said outer load ring being radially linked to said inner load ring by at least one web member of said plurality of web members.

28. Apparatus of claim 29, further comprising a first plate positioned to one side of the outer load ring, and a second plate positioned to another side of the outer load ring, adjacent ones of said ring segments of said outer load ring being attached to a different one of said first plate and said second plate.

29. In a motor operated valve which includes an actuator, a valve yoke, a valve plug, and a valve stem for transferring motive force from the actuator to the valve plug to move the valve plug between an open and a closed position, a pre-calibrated apparatus is provided for measuring actual valve stem operating load apparatus comprising:
an inner load ring, said inner load ring including, at least, a body section, an inside perimeter defining a passage, and an outside perimeter, said passage accommodating travel of the valve stem therethrough; said inner load ring further defines a plurality of mounting holes formed in said body section;
an outer load ring, said outer load ring including, at least, a body section, an inside perimeter, and an outside perimeter, said outer load ring further defines a plurality of mounting holes formed in said body section;
a plurality of web members radially linking said outside perimeter of said inner load ring and said inside perimeter of said outer load ring, said web members being the sole load bearing members between said inner load ring and said outer load ring; and
first measurement means attached to at least one of said web members for measuring forces within said web member; and
wherein the center lines of said mounting holes of said inner load ring and the center lines of said mounting holes of said outer load ring are all aligned along a common circle.

30. Apparatus of claim 29, wherein said inner load ring is comprised of two halves, each of said halves comprising, at least, a lap-joint segment, said lap-joint segment of one of said halves overlapping said lap-joint segment of the other of said halves to form a separable lap joint within said body section of said inner load ring; and
wherein said outer load ring is comprised of two halves, each of said halves comprising, at least, a lap-joint segment, said lap-joint segment of one of said halves overlapping said lap-joint segment of the other of said halves to form a separable lap-joint within said body section of said outer load ring.

31. Apparatus of claim 30, further comprising, at least, first fastening means for releasably fastening together said two halves of said inner load ring, and second fastening means for releasably fastening together said two halves of said outer load ring.

32. Apparatus of claim 29, wherein each said mounting hole of said inner load ring is angularly displaced from each said mounting hole of said outer load ring.

33. In a motor operated valve which includes an actuator, a valve yoke, a valve plug, and a valve stem for transferring motive force from the actuator to the valve plug to move the valve plug between an open and a closed position, a pre-calibrated apparatus is provided for measuring actual valve stem operating load apparatus comprising:
- an inner load ring, said inner load ring including, at least, a body section, an inside perimeter defining a passage, and an outside perimeter, said passage accommodating travel of the valve stem therethrough;
- an outer load ring, said outer load ring including, at least, a body section, an inside perimeter, and an outside perimeter, wherein said outer load ring is comprised of a plurality of separate, ring segments, each said segment of said outer load ring being radially linked to said inner load ring by at least one web member of a plurality of web members;
- said plurality of web members radially linking said outside perimeter of said inner load ring and said inside perimeter of said outer load ring, said web members being the sole load bearing members between said inner load ring and said outer load ring;
- first measurement means attached to at least one of said web members for measuring forces within said web member; and
- a first plate positioned to one side of said outer load ring, and a second plate positioned to another side of said outer load ring, adjacent ones of said ring segments of said outer load ring being attached to a different one of said first plate and said second plate, each of said first plate and said second plate further comprising an aperture concentrically aligned with said passage of said inner load ring.

34. A load measuring apparatus, comprising:
- a first ring element, said first ring element including, at least, a body section, an inside perimeter defining a passage, and an outside perimeter, said passage accommodating travel of a shaft therethrough,
- a second ring element, said second ring element including, at least, a body section, an inside perimeter, and an outside perimeter;
- a plurality of web members radially linking said outside perimeter of said first ring element and said inside perimeter of said second ring element, said web members being the sole load bearing members between said first ring element and said second ring element; and
- first measurement means attached to at least one of said web members for measuring forces within said web member; and
- wherein said first ring element further defines a plurality of mounting holes formed in said body section of said first ring element, and wherein said second ring element further defines a plurality of mounting holes formed in said body section of said second ring element; and wherein the center lines of said mounting holes of said first ring element are all aligned along a common circle.

35. A load measuring apparatus, comprising:
- a first ring element, said first ring element including, at least, a body section, an inside perimeter defining a passage, and an outside perimeter, said passage accommodating travel of a shaft therethrough,
- a second ring element, said second ring element including, at least, a body section, an inside perimeter, and an outside perimeter;
- a plurality of web members radially linking said outside perimeter of said first ring element and said inside perimeter of said second ring element, said web members being the sole load bearing members between said first ring element and said second ring element; and
- first measurement means attached to at least one of said web members for measuring forces within said web member; and
- wherein said first ring element is comprised of two halves, each of said halves comprising, at least, a lap-joint segment, said lap-joint segment of one of said halves overlapping said lap-joint segment of the other of said halves to form a separable joint within said body section of said first ring element; and
- wherein said second ring element is comprised of two halves, each of said halves comprising, at least, a lap-joint segment, said lap-joint segment of one of said halves overlapping said lap-joint segment of the other of said halves to form a separable joint within said body section of said first ring element.

36. In combination:
- an axial member movable between limits;
- a motive force generator providing motive force to said axial member to move said member between said limits;
- a load resisting movement of said axial member between said limits, whereby forces are delivered by said axial member to said load;
- an in-series load bearing web assembly positioned between said motive force generator and said load for sensing said forces delivered by said axial member to said load, said web assembly comprises, at least:
  - a first web support member centered around said axial member, said first web support member including, at least, a body section and an inside perimeter defining a passage, said passage accommodating travel of said axial member therethrough,
  - a second web support member,
  - a plurality of web members supported between said first web support member and said second web support member, each said web member of said plurality of web members extending radially along a ray centered at the axis of the axial member,
  - said web members being the sole load bearing members between said first web support member and said second web support member, and
  - first measurement means attached to at least one of said web members for measuring forces within said web member,
- whereby forces reactionary to the forces delivered by the axial member are experienced at the web members and measured by the measurement means.

* * * * *